Figure 1:
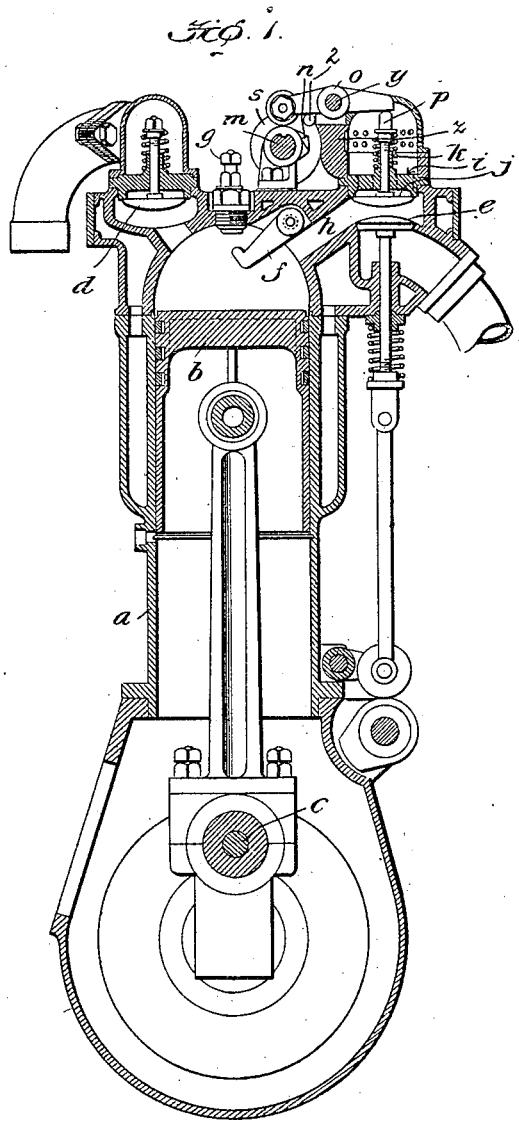

No. 838,399. PATENTED DEC. 11, 1906.
C. R. GREUTER.
INTERNAL COMBUSTION ENGINE.
APPLICATION FILED JUNE 5, 1906.

3 SHEETS—SHEET 1.

Inventor
Charles R. Greuter

Witnesses

No. 838,399. PATENTED DEC. 11, 1906.
C. R. GREUTER.
INTERNAL COMBUSTION ENGINE
APPLICATION FILED JUNE 5, 1906.

3 SHEETS—SHEET 3.

Witnesses

Inventor
Charles R. Greuter
by
Henry M. Bryhn
his Attorney

UNITED STATES PATENT OFFICE.

CHARLES R. GREUTER, OF WILKES-BARRE, PENNSYLVANIA, ASSIGNOR TO MATHESON MOTOR CAR COMPANY, OF WILKES-BARRE, PENNSYLVANIA, A CORPORATION.

INTERNAL-COMBUSTION ENGINE.

No. 838,399.     Specification of Letters Patent.     Patented Dec. 11, 1906.

Application filed June 5, 1906. Serial No. 320,325.

*To all whom it may concern:*

Be it known that I, CHARLES R. GREUTER, a citizen of the United States, residing at Wilkes-Barre, in the county of Luzerne and State of Pennsylvania, have invented certain new and useful Improvements in Internal-Combustion Engines, of which the following is a specification.

This invention relates to internal-combustion engines; and it has for its object the provision of means whereby when the supply of combustible is throttled down to that point at which the piston cannot draw in a full charge air may be drawn into the cylinder during a part of the stroke to take the place of that part of the combustible which is cut off by the throttle, to the end that during the full suction-stroke the piston may not work against a partial vacuum and to the end that upon the return movement of the piston after the suction-stroke the full compression of the reduced charge of combustible may be effected the same as if the cylinder contained the full charge.

It is of course self-evident that when only enough combustible is drawn into the cylinder to half fill the same this reduced charge will only be compressed to one-half the density of a full charge, and therefore the full efficiency of the reduced charge cannot be utilized.

By means of my invention a valve or valves are provided in the cylinder whereby a free passage to the atmosphere may be maintained during the first part of the suction-stroke of the engine, the time of closing of which may be regulated as desired, and it is only after the closing of this valve that the partial vacuum caused by the continued movement of the piston will cause the inlet-valve to open and admit the combustible into the cylinder, which at the completion of the suction-stroke of the piston will be completely filled, a stratum of combustible occupying that end of the cylinder constituting the explosion-chamber and a stratum of air occupying that portion of the cylinder between the combustible and the piston.

I have found in practice that the air and the combustible do not mix to any appreciable extent when admitted to the cylinder in the manner set forth, and I thus obtain the full compression of the reduced charge whereby I attain the full efficiency of that charge, and am therefore able to economize in combustible, for the reason that without full compression of the reduced charge a larger quantity of combustible must be introduced to make up for the lack of compression, and, furthermore, by means of this construction the piston is never working against a partial vacuum on the suction-stroke.

My invention is fully illustrated in the accompanying drawings, in which—

Figure 2:
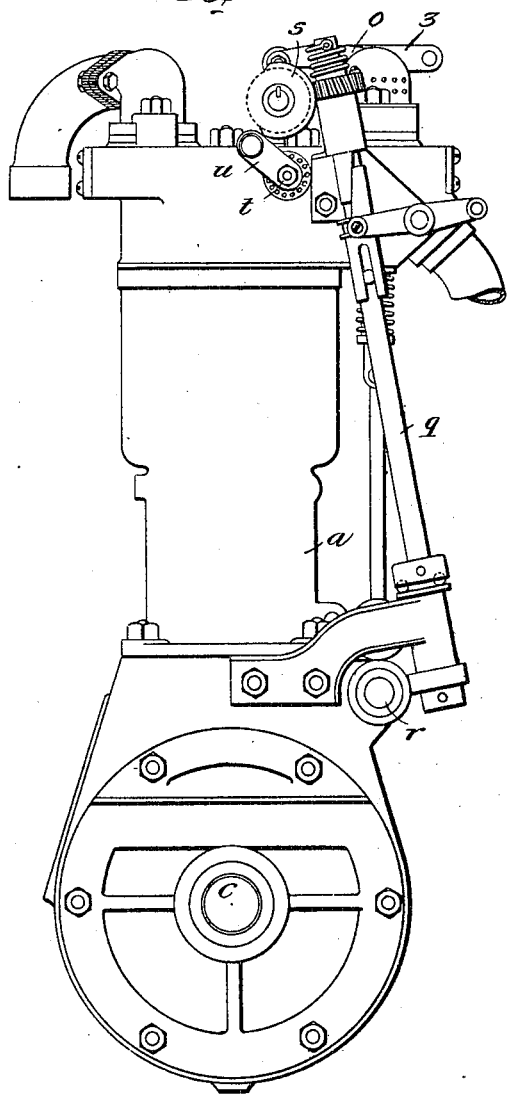
Figure 3:
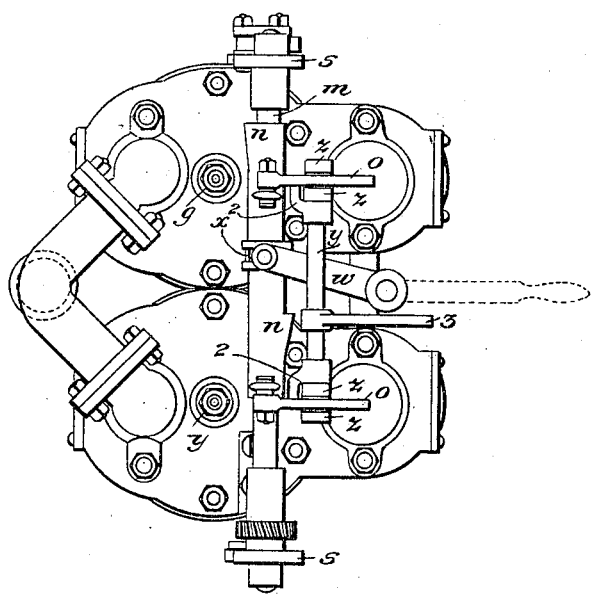

Figure 1 is a sectional elevation of a motor embodying my invention. Fig. 2 is a side elevation of the same. Fig. 3 is a top plan view of the motor, which is of the two-cylinder type.

While in the drawings a motor of the two-cylinder type is shown, it is obvious that the invention is equally applicable to a motor having less or more than two cylinders.

Referring to Fig. 1, the general features of the motor therein shown are common to all motors of the internal-combustion type, $a$ indicating the cylinder, $b$ the piston connected with the crank-shaft $c$, the cylinder being provided with the inlet-valve $d$, through which the combustible may enter, and with exhaust-valves $e$, through which the products of combustion may be expelled.

$f$ is an oscillating arm which constitutes one terminal of an electrical circuit, and $g$ is a plug in the cylinder, constituting the other terminal of said circuit, the contact of the arm with said plug serving to ignite the charge after the manner of all ignition devices of this type, which are too well known to need description.

In the passage $h$, leading to the exhaust-valve $e$, there is an opening $i$, closed by an inwardly-opening valve $j$, held up against its seat by a spring $k$. Mounted in suitable bearings on the end of the cylinder is a cam-shaft $m$, on which is a cam $n$, which operates to lift periodically one end of an arm $o$, whose opposite end rests on the end of the stem $p$ of the valve $j$. The cam-shaft $m$ is rotated by the vertical shaft $q$, which has a gear connection with the shaft $r$, which in turn is driven from the crank-shaft by a suitable gear within the casing, but not shown in the drawings. The speed of rotation of said shaft $r$ is regulated to give the proper time to the valve movements.

Incidentally it may be remarked that by means of suitable cams s, mounted on the end of the shaft m, the hammer-arms f within the explosion-chamber of the cylinder are actuated, the shaft on which the arm f is supported extending through the wall of the cylinder and (indicated by t, Fig. 2) has on the outer end thereof an arm u, which bears against the cam f.

By referring to Fig. 3 it is seen that the cams n—one for each cylinder—are both formed on the long hub and have a spline-and-groove connection with the shaft m, whereby it may rotate with said shaft and move freely endwise thereon, said endwise movement being imparted thereto by means of an arm w, engaging with an annular groove x in said hub between the cams. The hub of each of the cams n is cylindrical to the end that when the latter are moved on the shaft m in one direction the arm o will bear on the cylindrical part of said cam and the valves j will not be actuated. This is the normal position of the parts when the motor is running at substantially full capacity. If, however, it becomes desirable to reduce the charge of combustible, the arm w may be operated to slide the cams n under the ends of the arms o to such a degree as will cause the valves j to open to the desired extent for the length of time required to admit air in such volume as is necessary to replace the volume of combustible which it is desired to cut off from the normal charge, and the cams n are so timed that whenever they are brought into action they will operate the valves j at the beginning of the suction-stroke of the piston, and the air will therefore invariably enter the cylinder in advance of the combustible. This arrangement insures the filling of the explosion-chamber or the explosion end of the cylinder with the combustible, which is drawn in after the required volume of air, and, as stated above, although this combustible is drawn into the cylinder while there is air in the latter the uninterrupted movement of the piston serves to effect the disposition of the combustible and the air in practically separate strata in the cylinder.

The arms o are mounted to swing on their supporting-shaft y, and this shaft is loosely supported in bearings z. Secured to the shaft near these bearings z is a finger 2, which extends around under that end of the arm o which bears on the cam n. At some point on the shaft y there is secured an arm 3, whereby the shaft may be rocked manually in its bearings and the fingers 2 made to thereby operate the arms o to hold open the valve or valves j for a longer or shorter period at the will of the operator. The object of this construction is to prevent the full compression of the charge, and thus insure the easy rotation of the crank-shaft during the few turns which must be given to the latter to start the motor. It is therefore apparent that the valves j, operating automatically, will relieve the piston from the drag due to its working against a partial vacuum under certain conditions, and, furthermore, when the valves are opened manually in starting the motor the compression may be relieved, whereby the motor may be easily turned over to effect the initial ignition, and, as stated above, the air valve or valves may be actuated in the manner described to regulate the speed of the engine by providing means whereby the operator may control at will the capacity of the combustible-receiving space in the cylinder or cylinders of the engine.

I claim—

1. The combination with the cylinder of an internal-combustion engine having a charge-inlet and an exhaust-valve, of an auxiliary air-supply valve independent of said charge-inlet valve, mechanism for automatically opening and closing said air-supply valve in advance of the opening of the charge-inlet valve, and means for controlling said mechanism to vary the degree of opening of said air-supply valve.

2. The combination with the cylinder of an internal-combustion engine having a charge-inlet valve and an exhaust-valve, of an auxiliary air-supply valve independent of said charge-inlet valve, means for automatically opening and closing said air-supply valve in advance of the opening of the charge-inlet valve and also for varying the degree of opening thereof, and means for manually opening said auxiliary valve independently of its automatic means.

3. In an internal-combustion engine, a cylinder having inlet and exhaust valves, together with an auxiliary valve in the cylinder, spring-held to its seat, a rotating shaft and a tapered cam thereon engaging said valve, whereby the latter may be opened and closed in advance of the opening and closing of the inlet-valve, and means for sliding said cam on the shaft to vary the degree of opening of the valve.

4. The combination in an internal-combustion engine, of charge-supplying means, a separate valve to admit air to the cylinder, and means to effect the opening and closing of this valve at such time that air alone is admitted to the cylinder in advance of the admission of the combustible, during the same half-stroke of the piston, and then its admission cut off.

In testimony whereof I have signed my name to this specification in the presence of two subscribing witnesses.

CHAS. R. GREUTER.

Witnesses:
R. M. COUGHLIN,
FRANK L. LESCAULT.